United States Patent
Lin

(10) Patent No.: US 7,317,867 B2
(45) Date of Patent: Jan. 8, 2008

(54) INPUT BUFFER MANAGEMENT FOR THE PLAYBACK CONTROL FOR MP3 PLAYERS

(75) Inventor: Tzueng-Yau Lin, Tai-Chung Hsien (TW)

(73) Assignee: MediaTek Inc., Hsin-Chu (TW)

( * ) Notice: Subject to any disclaimer, the term of this patent is extended or adjusted under 35 U.S.C. 154(b) by 1223 days.

(21) Appl. No.: 10/064,410

(22) Filed: Jul. 11, 2002

(65) Prior Publication Data

US 2004/0008975 A1 Jan. 15, 2004

(51) Int. Cl.
*H04N 5/91* (2006.01)
*H04N 5/928* (2006.01)
*H04N 5/00* (2006.01)

(52) U.S. Cl. .............. 386/95; 386/96; 386/125

(58) Field of Classification Search .......... 710/53, 710/56; 704/1, 200, 500; 386/1, 46, 65, 386/75, 95–97
See application file for complete search history.

(56) References Cited

U.S. PATENT DOCUMENTS

| 6,466,476 B1 * | 10/2002 | Wong et al. ........... 365/185.03 |
| 6,567,364 B1 | 5/2003 | Takahashi et al. |
| 6,721,710 B1 * | 4/2004 | Lueck et al. ................ 704/500 |
| 6,929,440 B1 * | 8/2005 | Grond ................ 414/284 |
| 7,069,208 B2 * | 6/2006 | Wang ................ 704/211 |
| 2003/0004708 A1 * | 1/2003 | Oomen et al. .......... 704/200.1 |

FOREIGN PATENT DOCUMENTS

JP P2000-182332 A 6/2000

OTHER PUBLICATIONS

Gadd, Staffan; Lenart, Thomas; "A Hardware Accelerated MP3 Decoder with Bluetooth Streaming Capabilities" Master of Science Thesis, Nov. 2001, pp. 5-7,24,25.*

\* cited by examiner

*Primary Examiner*—Thai Q. Tran
*Assistant Examiner*—Michael P Choi
(74) *Attorney, Agent, or Firm*—Winston Hsu

(57) ABSTRACT

Input buffer management of the playback control for MP3 players includes initializing a totalizer to zero, finding a synchronization word of a frame, decoding a header, calculating the size of a main_data field, and decoding the enclosed audio data. If it is determined the value contained in the totalizer is less than the main_data_begin of this frame, store the main_data of the frame in an input buffer, add the size of the main_data to the totalizer, and repeat the process starting with finding the synchronization word of a next frame until the totalizer is greater or equal to the main_data_begin of the then current frame. At this point, all of the audio data required by the frame is currently available and decoding and playing can continue as normal.

6 Claims, 3 Drawing Sheets

INPUT BUFFER MANAGEMENT FOR THE PLAYBACK CONTROL FOR MP3 PLAYERS

BACKGROUND OF INVENTION

1. Field of the Invention

The present invention relates to input buffer management of the playback control for MP3 (Motion Pictures Experts Group Layer III Audio) players. More specifically, a method that initially stores incomplete main_data from MP3 frames in the input buffer until enough main_data is available to correctly decode a frame, allowing the decoding of an MP3 file beginning at an entry point in the MP3 file other than the start of the MP3 file is disclosed.

2. Description of the Prior Art

MPEG-1 audio layer III (MP3) is an ISO/IEC (International Organization for Standardization and International Electrotechnical Commission) standard of audio coding with high quality as well as high efficiency.

FIG. 1 is a block diagram of a traditional MP3 player 10 for reading MP3 files from medium sources such as an optical disk. The MP3 player 10 has a parser 101, an input buffer 102, and an MP3 decoder 103. The MP3 decoder 103 decodes the frames moved from the medium source to the input buffer 102 by the parser.

Referring to FIG. 2, an MP3 file contains a number of frames. Each frame is a unit of data that is enough for decoding and generating a certain amount of audio samples. Take frame 7 for example. The frame 7 includes a header 71, an error check 72, a sample data 73, and an external data 74. The header 71 is a 32-bit stream including a 12-bit synchronization word. In addition, the header 71 has 2 bits for sampling frequency, 4 bits for bitrate, and other information. The error check 72 is an optional 16-bit stream for error detection. Sample data 73 includes necessary information for decoding audio samples of this frame. External data 74 includes data other than audio information. Sample data 73 includes main_data_begin 731 audio_data 732, and main—data 733. The main_data_begin 731 will be described later. The audio_data 732 contains parametric information about the decoding algorithm and main_data 733 contains data of the encoded audio samples. The size of audio_data 732 and main_data 733 may vary in different frames. Although the contents and size of frames may vary from frame to frame, each of the frames, such as frames 1, 4, 5, 6, 7, and 8 shown in FIG. 2, comprise the same structure, for example each of the frames 1, 4, 5, 6, and 8 comprise a main—data field corresponding to the main_data 733 of frame 7 and a main_data_begin field corresponding to the main_data_begin 731 of FIG. 7.

Not all kinds of audio information require the same amount of space after compression. For example, a certain time duration of silence requires less storage space than the same time duration of complex orchestra music when being compressed. Therefore when encoding a bit stream of MP3, the MP3 standard allows an overflow of the main data 733 from one frame into the unused space of prior frames so as to fully utilize the bandwidth.

For example, the size of the main_data 733 of a certain frame is 100 bytes and the required size of the audio samples is 203 bytes. The 103 bytes of overflow will be allocated to a main_data of prior frames, such as a main_data of a frame 6. If the size of the main—data of frame 6 is still not enough for storage of the 103 bytes, a main_data of a frame 5 will be used. The main_data_begin 731 will have a value of 103 indicating the size of the overflow is 103 bytes. If the size of the main_data of frame 6 is only 70 bytes, then there will still be another 33 bytes of overflow. The 33 bytes of overflow will again be allocated to the main_data of the frame 5. To avoid an error, the MP3 standard requests that the main_data_begin of the first frame of an MP3 file, which is frame 1 in FIG. 2, must be zero.

To correctly decode the frames, the MP3 decoder 103 may need the data of several frames beforehand when decoding a particular frame. Thus, the MP3 decoder 103 prefers to decode the frames including the first frame of the MP3 file. However, in some playback modes, such as AB repeat mode or reverse mode, the parser 101 may provide frames which do not start from the first frame of the MP3. In some other cases, the MP3 file is damaged and the main_data_begin does not have a correct value. Since the traditional MP3 decoder 103 directly decodes all the frames regardless of the content of the main_data_begin of the frame, the decoder 103 cannot correctly decode the frames and a "bang" noise may occur as the MP3 player 10 starts playing.

SUMMARY OF INVENTION

It is therefore a primary objective of the claimed invention to provide an input buffer management method for the playback control for MP3 players to solve the problem of a "bang" noise while allowing the decoding and playing of the first frame that can be decoded and played correctly, minimizing lost sound.

Briefly summarized, the preferred embodiment of the claimed invention discloses initializing a totalizer to zero, finding a synchronization word of a frame, decoding a header, calculating the size of a main_data, and decoding the enclosed audio data. Then, a check is performed to determine if the value in the totalizer is greater or equal to a value contained in a main_data_begin of this frame. If the totalizer is less than the main_data_begin of this frame, add the calculated length of main_data to the totalizer, store data from this frame into an input buffer, and repeat the process starting with finding the synchronization word of a next downstream frame until the totalizer is greater or equal to the main_data_begin of a then current frame. At this point, all of the audio data required by the frame is currently available and decoding and playing can continue as normal.

It is an advantage that in the input buffer management method of the claimed invention that the "bang" noise is avoided and a first frame that can be correctly decoded and played is decoded and played regardless of the entry point into the file or the direction in which the file is played.

These and other objectives of the claimed invention will no doubt become obvious to those of ordinary skill in the art after reading the following detailed description of the preferred embodiment, which is illustrated in the various figures and drawings.

DETAILED DESCRIPTION

The present invention allows the correct playing of an MP3 file from any frame in the MP3 file and in either direction while eliminating the "bang" noise. The present method only needs to be invoked when beginning to play an MP3 file and works by properly selecting a first frame for which all data associated with the frame to be decoded has been read. Decoding the main_data of the frame is preferably processed using the Huffman decoding method. Such MP3 file decoding methods are well known in the art and will not be discussed here.

Figure 1:
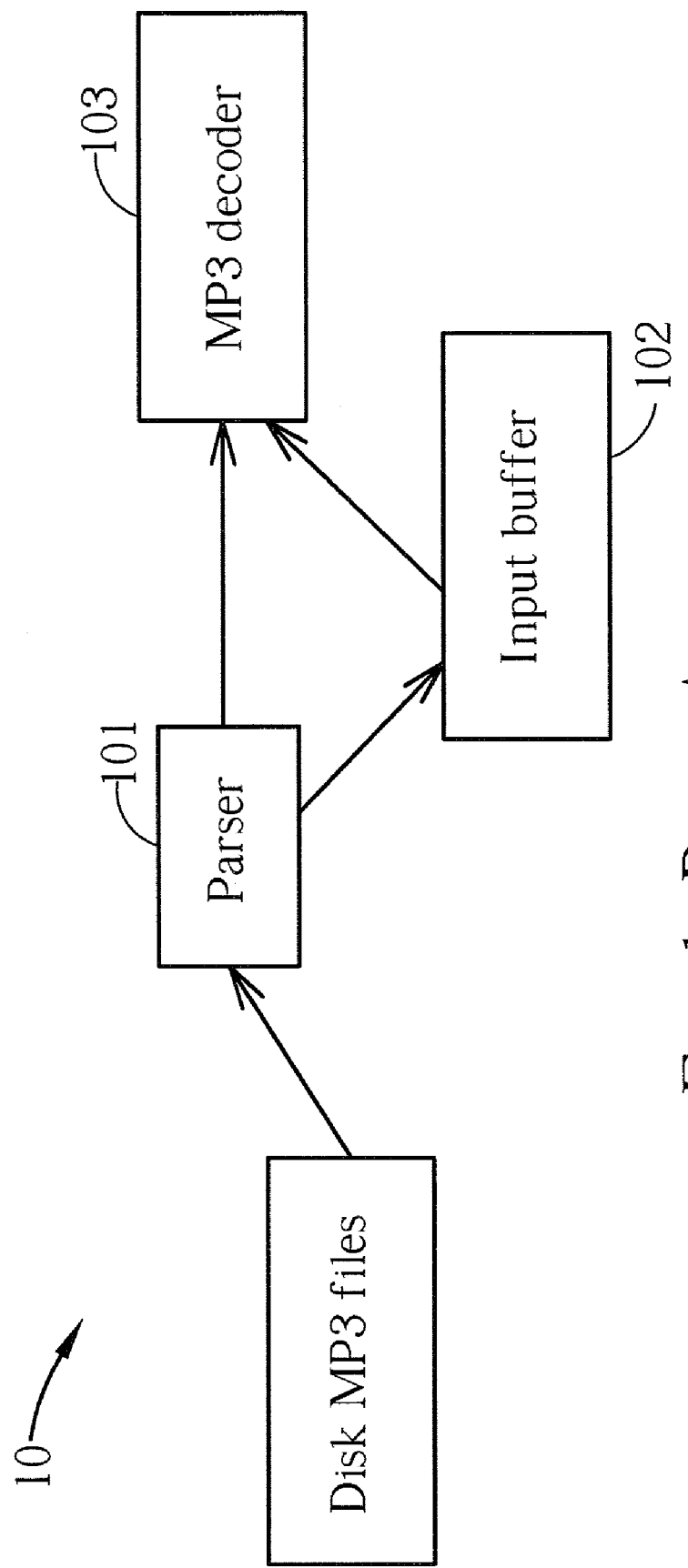
FIG. 1 is a diagram of an MP3 (Motion Pictures Experts Group Layer III Audio) frame according to a prior art.
Figure 2:
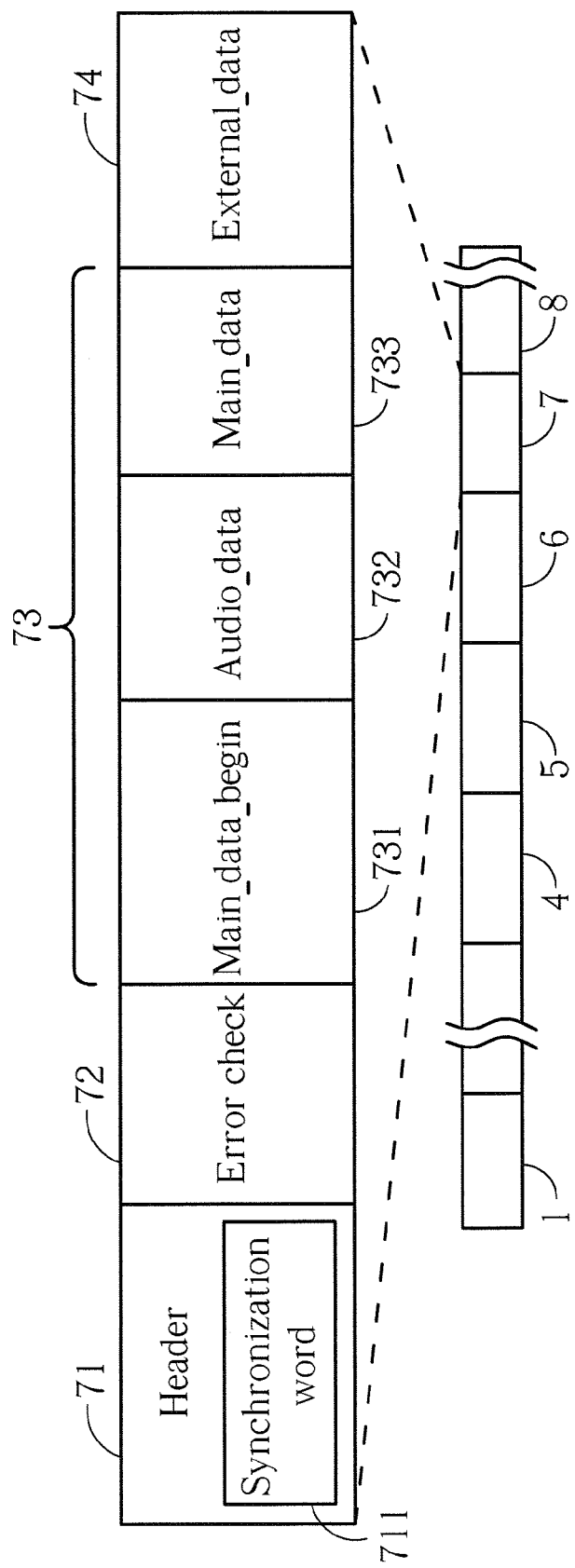
FIG. 2 is a block diagram of an MP3 file.
Figure 3:
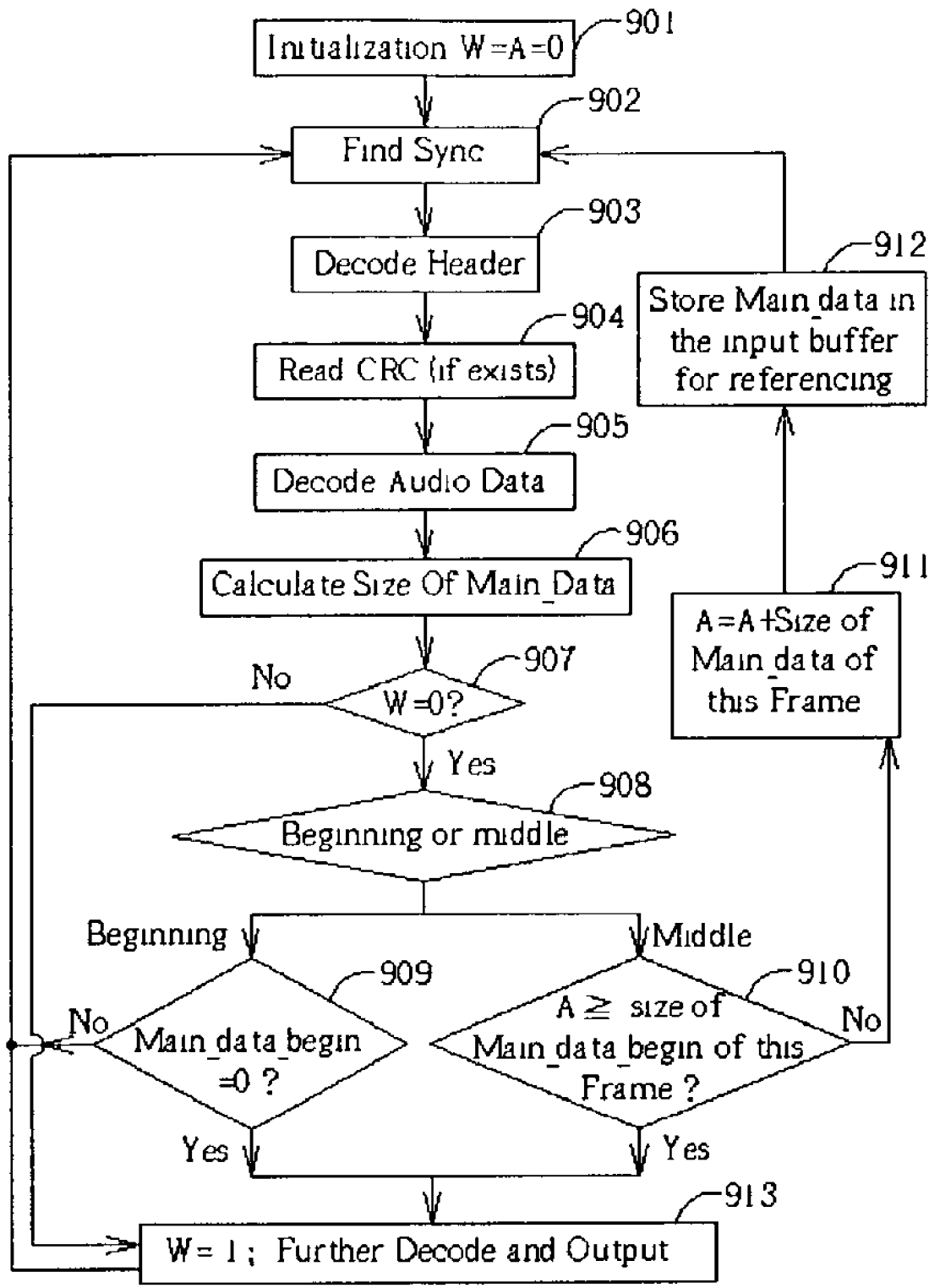
FIG. 3 is a flowchart according to one embodiment of the present invention.

FIG. 3 illustrates a flow chart of one embodiment according to the present invention. The input buffer 102 associated with the decoding process is flushed so as to clear itself of unwanted data. In the preferred embodiment, two variables are used. It should be noted that using other quantities or types of variables or accumulators such as registers or counters still falls within the spirit of the invention. In this paper, the term totalizer is used and is defined here as any device that allows maintenance of a running total.

In FIG. 3, a variable W may be of a Boolean type and is used to denote whether or not a starting frame has been located so that the current frame can be fully and correctly decoded and played. In this embodiment, W is initialized to false, (for example, a value of zero). A totalizer A is used as a totalizer to hold a sum of the size of main-data fields which has already been placed into the input buffer 102. The totalizer A is also initialized to zero. After initialization (step 901), the parsing of an MP3 bitstream can begin.

The next step 902 involves searching the bit stream for a first occurrence of a 12 bit synchronization word. When the synchronization word 711 has been located, the header 71 of the frame 7 is decoded providing bitrate and other miscellaneous information (step 903). The header 71 includes a bit signifying whether or not error checking is to be used within the frame. If error checking is used in this MP3 file, the error check 72 is read next (step 904), but, as with any MP3 player 10, using the error check 72 is merely a design choice and the present invention is not limited to the reading or not reading of this field. Next, the sample data 73 is decoded, the main_data_begin 731 is read (step 905). Then the size of the main—data 733 is calculated (step 906).

At this point, the critical decision in the selection of a starting frame begins. A check is made to see if the variable W is still false (for example, equal to zero), meaning that as of yet, no starting frame has been found (step 907). If the variable W is true (for example, not equal to zero), then a starting frame has been found, no further decisions are necessary, and further decoding and outputting proceed as normal (step 913). However, if the variable W is still false, it is not known if enough data has been read to further process and play this frame.

If the variable W is still false, two things about the bit stream are known. One is that no starting frame has yet been found (W=0) and the other is the amount of data that has been already read and placed into the input buffer so far. The totalizer A records the amount of data read into the input buffer 102. The main_data_begin 731 of the current frame 7 is used to indicate whether or not the audio samples stored in the current main_data 733 are complete. If the audio samples stored are not complete and there are still some bytes stored in previous frames, the amount of the overflow will be indicated in the main_data_begin 731. For example, if the required sample is 203 bytes and the size of the current main_data 733 is 100 bytes, a value of 103 will be stored in the main_data_begin 731, indicating there are still 103 bytes stored in the main_data field of previous frames. Therefore, the MP3 decoder 103 needs to locate and decode the preceding bytes in previous frames. The main_data_begin 731 specifies the location as a negative offset in bytes. A check is made to see if the totalizer A (the amount of data already read into the input buffer 102) is greater than or equal to the main_data_begin of the current frame.

While the parser 101 parsed the series of frames to the decoder 103, the parser 101 will also notify the decoder 103 whether to decode the audio samples from the beginning of an MP3 file, or from the middle of an MP3 file (step 908). In a first circumstance when the MP3 player needs to play the MP3 file from the middle of the MP3 file, if the totalizer A is greater than or equal to the main_data_begin 731 of the current frame 7 (step 910), it is guaranteed that enough data has already been read and stored in the input buffer 102 to correctly process and decode the current frame 7. Therefore, the variable W is changed to be true (for example, a non-zero value), signifying that the bit stream may be correctly processed from then on (step 913).

On the other hand, if value stored in the totalizer A is less than the value stored in the main_data_begin 731 of the current frame 7, not enough data has been read and placed into the input buffer to guarantee that the current frame 7 can be processed and played correctly. Therefore, the size of the current main_data 733 of this frame 7 is added to the value contained in the totalizer A and the result is stored in the totalizer A (step 911). Additionally, the main_data 733 from the frame is stored in the input buffer 102 for later referencing (step 912).

Since the starting frame has not yet been found, the decoder 103 should repeat the above steps, beginning with locating the synchronization word of the next frame, decoding the header, sample data, and others. If the value of the then current frame's main_data_begin is still larger than the totalizer A, the above accumulation process is repeated, which means the size of the main_data of the then current frame is added to totalizer A and the decoder starts to find a next synchronization word again. The process is repeated until the decoder 103 finds a frame in which the main_data_begin in the frame is less or equal to the totalizer A. At that point, the decoder 103 has enough data and it may start processing data and outputting samples.

In a second circumstance when the MP3 player 10 needs to play the MP3 file from the beginning of the MP3 file, since the normal encoding ensures the main_data_begin of the first frame being zero, we can use this as an error detection criteria (step 909). In other words, if the main_data_begin of the first frame is not zero, the decoder discards this frame and search for the synchronization word in the next frame (step 902). The decoder 103 repeats this process until it finds the frames with a main_data_begin having a value of zero.

In contrast to the prior art, the present invention does not have to skip frames read to guarantee correct processing and playing of the MP3 bitstream upon startup. Neither does the present invention discard frames until a legal frame, one that contains all the main_data associated with the frame, is found. Both methods can result in a noticeable loss of startup audio and reduced performance.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of managing an input buffer in a media player for playing a media file, the media file comprising a stream of frames, each frame having at least a main_data field containing encoded media samples and a main_data_begin field indicating an overflow of the main_data field, the media player including a parser, an input buffer, a decoder, and a totalizer, the parser is capable of parsing the stream of frames to the decoder and informing the decoder whether to decode from the beginning of the media file, or from the middle of the media file, the method comprising:

if the decoder is informed to decode from the middle of the media file, then:

locating a first frame having a first main_data_begin field and a first main_data field, if a value in the totalizer is less than a value in the first main_data_begin field, adding a size of the first main_data field to the totalizer, and storing the first main_data field in the input buffer; and locating a second frame which is downstream to the first frame, the second frame having a second main_data_begin field and a second main_data field, if a value in the totalizer is equal to or larger than a value in the second main_data_begin field, decoding the stream of frames starting from the second frame using both the first main_data field stored in the input buffer and the second main_data field; and if the decoder is informed to decode from the beginning of the media file, then locating a third frame having a third main_data_begin field with a value of zero and a third main_data field, and decoding the stream of frames starting from the third frame.

2. The method of claim 1 wherein the media file is an MP3 file.

3. The method of claim 1 wherein the totalizer is initialized to zero.

4. A method of managing an input buffer in a media player for playing a media file, the media file comprising a stream of frames, each frame having at least a main_data field containing encoded media samples and a main_data_begin field indicating an overflow of the main_data field, the media player including a totalizer and an input buffer, the method comprising:

locating a first frame having a first main_data_begin field and a first main_data field, if a value in the totalizer is less than a value in the first main_data_begin field, adding a size of the first main_data_field to the totalizer, and storing the first main_data_field in the input buffer; and locating a second frame which is downstream to the first frame, the second frame having a second main_data_begin field and a second main_data field, if a value in the totalizer is equal to or larger than a value in a second main_data_begin field, decoding the stream of frames starting from the second frame using both the first main_data field stored in the input buffer and the second main_data field.

5. The method of claim 4 wherein the media file is an MP3 file.

6. The method of claim 4 wherein the totalizer is initialized to zero.

* * * * *